US007661599B2

(12) United States Patent
Allen et al.

(10) Patent No.: US 7,661,599 B2

(45) Date of Patent: Feb. 16, 2010

(54) LABEL AND METHOD OF MAKING

(75) Inventors: Loretta E. Allen, Hilton, NY (US); Robert C. Bryant, Honeoye Falls, NY (US); William H. Simpson, Pittsford, NY (US); David L. Patton, Webster, NY (US); Peter A. Frosig, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1207 days.

(21) Appl. No.: 10/762,169

(22) Filed: Jan. 21, 2004

(65) Prior Publication Data

US 2004/0149830 A1 Aug. 5, 2004

Related U.S. Application Data

(60) Division of application No. 10/310,519, filed on Dec. 5, 2002, now Pat. No. 6,790,477, which is a continuation-in-part of application No. 10/213,991, filed on Aug. 7, 2002, now Pat. No. 6,759,369.

(51) Int. Cl.
*G06K 19/02* (2006.01)

(52) U.S. Cl. ...................................... 235/488; 235/493

(58) Field of Classification Search ................. 235/488, 235/487, 493; 428/32.1–32.19; 283/72–96
See application file for complete search history.

(56) References Cited

U.S. PATENT DOCUMENTS

| | | | | |
|---|---|---|---|---|
| 3,755,730 | A * | 8/1973 | Vogelgesang | 382/104 |
| 3,864,855 | A * | 2/1975 | Pekko et al. | 283/94 |
| 4,923,749 | A * | 5/1990 | Talvalkar | 428/32.84 |
| 4,980,222 | A * | 12/1990 | Rivera et al. | 428/195.1 |
| 5,410,642 | A * | 4/1995 | Hakamatsuka et al. | 358/1.14 |
| 5,747,155 | A * | 5/1998 | Miller et al. | 428/32.69 |
| 5,856,048 | A * | 1/1999 | Tahara et al. | 430/1 |
| 6,214,443 | B1 * | 4/2001 | Palmasi et al. | 428/203 |
| 6,354,501 | B1 * | 3/2002 | Outwater et al. | 235/462.01 |
| 6,358,588 | B1 * | 3/2002 | Edwards et al. | 428/42.2 |
| 6,436,483 | B2 * | 8/2002 | Palmasi et al. | 427/510 |
| 6,562,178 | B1 * | 5/2003 | Romaine | 156/277 |
| 6,816,180 | B1 * | 11/2004 | Paz-Pujalt et al. | 347/224 |

* cited by examiner

*Primary Examiner*—Daniel St. Cyr

(57) ABSTRACT

A method of providing an image on a media having a image-receiving layer and a protective overlayer, comprising the steps of providing an image on the image-receiving and providing machine-readable indicia on said protective overlayer by varying the temperature of a thermal head used to apply the protective overlayer.

2 Claims, 12 Drawing Sheets

LABEL AND METHOD OF MAKING

CROSS-REFERENCE TO RELATED APPLICATIONS

This is a Divisional of U.S. application Ser. No. 10/310,519, filed Dec. 5, 2002 now U.S. Pat. No. 6,790,477 entitled IMPROVED LABEL AND METHOD OF MAKING by Loretta E. Allen, Robert C. Bryant, William H. Simpson, David L. Patton and Peter A. Frosig, which is a Continuation-in-Part of application Ser. No. 10/213,991 filed Aug. 7, 2002, now U.S. Pat. No. 6,759,369 entitled THERMAL DYE TRANSFERPRINT BEARING PATTERNED OVERLAYER AND PROCESS FOR MAKING SAME by William H. Simpson, David Andrew Johnson, Cobb S. Goff and David Edward Coons.

FIELD OF THE INVENTION

The invention relates to a thermal dye transfer print comprising a protective overlayer including indicia written in the protective overlayer.

BACKGROUND OF THE INVENTION

U.S. Pat. No. 6,092,942 (Koichi et al.) includes a thermal dye donor element composed of a yellow, magenta and cyan dye patch plus a protective overlayer which is applied to the receiver layer containing the printed image by means of a thermal print head. The protective layer is applied by using an image plane as a mask as opposed to a uniform application of energy down the page. The protective layer image is designed to have low and high energy areas arranged in a pattern to produce corresponding regions of density in the transferred protective layer. The final pattern in the transferred protective overlayer represents indicia that can be interpreted by detecting the variations in the thickness of the protective layer either mechanically or optically.

Traditional bar codes formed using a combination of the cyan, magenta and yellow dyes in a thermal printer produce a relatively poor machine-readable code because of the lack of carbon black in these dyes. Carbon black, and similar absorbing materials, enhance the absorption of the near-infrared and red wavelengths used by many handheld and point-of-sale scanners to read bar codes. Typically, for a bar code to be read reliably, it is preferred that the dyes used in the printing of the bar code symbol absorb light in the near infrared and red wavelengths.

Today, more and more information is required on a product label. More information requires a larger area onto which to print the information, which translates into bigger labels. Bigger labels may not be acceptable for many products, particularly small items such as beauty and pharmaceutical products. Thus, there is a need to provide Economy of label by providing more information often on smaller labels that are human and/or machine-readable.

The present invention provides a thermal dye transfer print bearing a protective overlayer wherein the overlayer is selectively applied in such a manner so as to represent indicia. The present invention also provides a thermal dye transfer print wherein at least a portion of the indicia provided in the protective overlayer is identical in content and location to indicia provided in the image layer so as to enhance the readability of the indicia. The present invention also provides a thermal dye transfer print wherein at least a portion of the indicia provided in the protective overlayer is different to indicia provided in the image layer. The invention also provides a process for making such prints as well as a method of reading the indicia.

The present invention also allows the providing of more information on a label than traditionally printing human readable indicia on an image layer. In particular, this is accomplished by thermally printing machine-readable indicia in a protective overlayer. The machine-readable indicia located in the protective overlayer can be located in the same area of the label as human-readable indicia. For instance, product information, information that the consumer is interested in, is printed on the image layer. Bar code information or other product tracking information, information that the consumer is not interested in, is printed in the protective overlayer. Therefore, a more aesthetically pleasing or attractive label can be manufactured comprising a print with a thermally transferred protective overlayer containing machine-readable indicia.

In addition, a method of enhancing the machine readability of a bar code printed with cyan, magenta and yellow dye is disclosed.

In accordance with one aspect of the present invention there is provided a method of providing a machine-readable indicia on a media having a protective overlayer comprising the steps of:

a) providing a $1^{st}$ machine-readable indicia in an image layer on the media;

b) providing a $2^{nd}$ machine-readable indicia in a protective overlayer that is identical in content to, and in register with the $1^{st}$ machine-readable indicia in the image layer.

In accordance with another aspect of the present invention there is provided a method of providing indicia on a media having a protective overlayer comprising the steps of:

a) providing a $1^{st}$ machine-readable indicia in an image layer on the media;

b) providing a $2^{nd}$ machine-readable indicia in a protective overlayer that is identical in content to, and in register with the $1^{st}$ machine-readable indicia in the image layer.

These and other aspects, objects, features and advantages of the present invention will be more clearly understood and appreciated from a review of the following detailed description of the preferred embodiments and appended claims and by reference to the accompanying drawings.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

Figure 1:
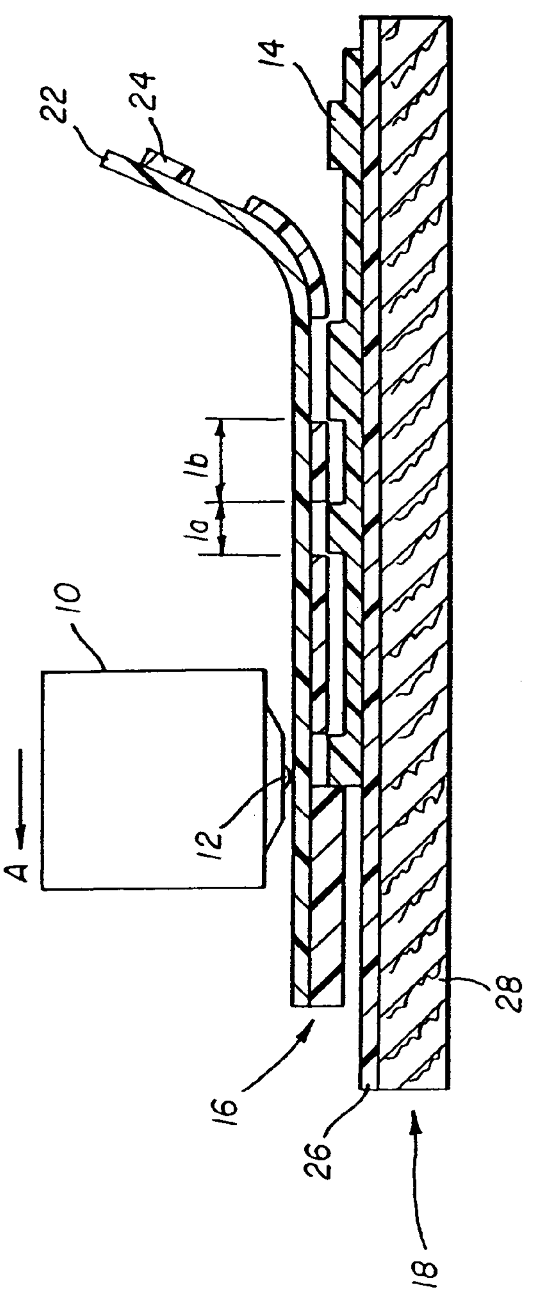
FIGS. 1-3 shows various embodiments of a print in the process of having the protective overlayer applied.

The invention is summarized above. It encompasses a thermal dye transfer print bearing a protective overlayer, wherein the protective overlayer comprises information-bearing indicia, especially indicia that is machine-readable, a process for making the print, and a method of reading the information-bearing indicia.

The print of the invention includes overcoat arrangements wherein the protective overlayer additionally comprises an IR absorbing dye or where the thickness of the protective overlayer varies.

The process for forming the protective overlayer on a thermal dye transfer print comprises:

1) applying to the print a solid sheet comprising a polymeric binder or layers of polymeric material; and
2) applying heat selectively to the surface of the protective overlayer sheet.

Suitably, in the process of the invention, the heat is applied via a thermal print head, especially one where the thermal print head is variable as to which pixels are energized and/or the extent to which pixels are energized. Alternatively, the protective overlayer contains an IR dye and the heat is applied via selective application of a laser beam.

Any dye can be used in the dye layer of the dye-donor element of the invention provided it is transferable to the image-receiving layer by the action of heat. Especially good results have been obtained with sublimable dyes. Examples of sublimable dyes include anthraquinone dyes, e.g., Sumikaron Violet RS® (Sumitomo Chemical Co., Ltd.), Dianix Fast Violet 3R FS® (Mitsubishi Chemical Industries, Ltd.), and Kayalon Polyol Brilliant Blue N BGM® and KST Black 146® (Nippon Kayaku Co., Ltd.); azo dyes such as Kayalon Polyol Brilliant Blue BM®, Kayalon Polyol Dark Blue 2BM®, and KST Black KR® (Nippon Kayaku Co., Ltd.), Sumikaron Diazo Black 5G® (Sumitomo Chemical Co., Ltd.), and Miktazol Black 5 GH® (Mitsui Toatsu Chemicals, Inc.); direct dyes such as Direct Dark Green B® (Mitsubishi Chemical Industries, Ltd.) and Direct Brown M® and Direct Fast Black D® (Nippon Kayaku Co. Ltd.); acid dyes such as Kayanol Milling Cyanine SR® (Nippon Kayaku Co. Ltd.); basic dyes such as Sumiacryl Blue 6G® (Sumitomo Chemical Co., Ltd.), and Aizen Malachite Green® (Hodogaya Chemical Co., Ltd.); or any of the dyes disclosed in U.S. Pat. No. 4,541,830, the disclosure of which is hereby incorporated by reference. The above dyes may be employed singly or in combination to obtain a monochrome. The dyes may be used at coverage of from about 0.05 to about 1 $g/m^2$ and are preferably hydrophobic.

A dye-barrier layer may be employed in the dye-donor elements of the invention to improve the density of the transferred dye. Such dye-barrier layer materials include hydrophilic materials such as those described and claimed in U.S. Pat. No. 4,716,144.

The dye layers and protection layer of the dye-donor element may be coated on the support or printed thereon by a printing technique such as a gravure process.

A slipping layer may be used on the backside of the dye-donor element of the invention to prevent the printing head from sticking to the dye-donor element. Such a slipping layer would comprise either a solid or liquid lubricating material or mixtures thereof, with or without a polymeric binder or a surface-active agent. Preferred lubricating materials include oils or semi-crystalline organic solids that melt below 100° C. such as poly(vinyl stearate), beeswax, perfluorinated alkyl ester polyethers, poly-caprolactone, silicone oil, poly(tetrafluoroethylene), carbowax, poly(ethylene glycols), or any of those materials disclosed in U.S. Pat. Nos. 4,717,711; 4,717,712; 4,737,485; and 4,738,950. Suitable polymeric binders for the slipping layer include poly(vinyl alcohol-co-butyral), poly(vinyl alcohol-co-acetal), polystyrene, poly(vinyl acetate), cellulose acetate butyrate, cellulose acetate propionate, cellulose acetate or ethyl cellulose.

The amount of the lubricating material to be used in the slipping layer depends largely on the type of lubricating material, but is generally in the range of about 0.001 to about 2 $g/m^2$. If a polymeric binder is employed, the lubricating material is present in the range of 0.05 to 50 weight %, preferably 0.5 to 40 weight %, of the polymeric binder employed.

Any material can be used as the support for the dye-donor element of the invention provided it is dimensionally stable and can withstand the heat of the thermal printing heads. Such materials include polyesters such as poly(ethylene terephthalate); polyamides; polycarbonates; glassine paper; condenser paper; cellulose esters such as cellulose acetate; fluorine polymers such as poly(vinylidene fluoride) or poly(tetrafluoroethylene-co-hexafluoropropylene); polyethers such as polyoxymethylene; polyacetals; polyolefins such as polystyrene, polyethylene, polypropylene or methylpentene polymers; and polyimides such as polyimide amides and polyetherimides. The support generally has a thickness of from about 2 to about 30 μm.

The image-receiving element that is used with the dye-donor element of the invention usually comprises a support having thereon a dye image-receiving layer (from now on to be referred to as an image-receiving layer). The support may be a transparent film such as a poly(ether sulfone), a polyimide, a cellulose ester such as cellulose acetate, a poly(vinyl alcohol-co-acetal) or a poly(ethylene terephthalate). The support for the image-receiving element may also be reflective such as baryta-coated paper, polyethylene-coated paper, white polyester (polyester with white pigment incorporated therein), an ivory paper, a condenser paper or a synthetic paper such as DuPont Tyvek®.

The dye image-receiving layer may comprise, for example, a polycarbonate, a polyurethane, a polyester, poly(vinyl chloride), poly(styrene-co-acrylonitrile), polycaprolactone or mixtures thereof. The dye image-receiving layer may be present in any amount which is effective for the intended purpose. In general, good results have been obtained at a concentration of from about 1 to about 5 $g/m^2$.

As noted above, the dye donor elements of the invention are used to form a dye-transfer image. Such a process comprises imagewise heating a dye-donor element as described above and transferring a dye image to an image-receiving element to form the dye-transfer image. After the dye image is transferred, the protection layer is then transferred on top of the dye image.

The dye donor element of the invention may be used in sheet form or in a continuous roll or ribbon. If a continuous roll or ribbon is employed, it may have only one dye or may have alternating areas of other different dyes, such as sublimable cyan and/or magenta and/or yellow and/or black or other dyes. Such dyes are disclosed in U.S. Pat. Nos. 4,541,830; 4,698,651; 4,695,287; 4,701,439; 4,757,046; 4,743,582; 4,769,360 and 4,753,922, the disclosures of which are hereby incorporated by reference. Thus, one-, two-, three- or four-color elements (or higher numbers also) are included within the scope of the invention.

In a preferred embodiment of the invention, the dye-donor element comprises a poly(ethylene terephthalate) support coated with sequential repeating areas of yellow, cyan and magenta dye, and the protection layer noted above, and the above process steps are sequentially performed for each color to obtain a three-color dye-transfer image with a protection layer on top. Of course, when the process is only performed for a single color, then a monochrome dye transfer image is obtained.

Thermal printing heads, which can be used to transfer dye from the dye-donor elements of the invention, are available commercially. There can be employed, for example, a Fujitsu Thermal Head FTP-040 MCSOO1, a TDK Thermal Head LV5416 or a Rohm Thermal Head KE 2008-F3.

A thermal dye transfer assemblage of the invention comprises (a) a dye-donor element as described above, and (b) an image-receiving element as described above, the dye-receiving element being in a superposed relationship with the dye donor element so that the dye layer of the donor element is in contact with the dye image-receiving layer of the receiving element.

The above assemblage comprising these two elements may be pre-assembled as an integral unit when a monochrome image is to be obtained. This may be done by temporarily adhering the two elements together at their margins. After transfer, the image-receiving element is then peeled apart to reveal the dye-transfer image.

When a three-color image is to be obtained, the above assemblage is formed on three occasions during the time when heat is applied by the thermal printing head. After the first dye is transferred, the elements are peeled apart. A second dye-donor element (or another area of the donor element with a different dye area) is then brought in register with the image-receiving element and the process is repeated. The third color is obtained in the same manner. Finally, the protection layer is applied on top.

EXAMPLES

A. Receiver Element:

The image-receiving element that is used with the dye-donor element of the invention usually comprises a support having thereon a dye-receiving layer. The support may be a transparent film such as a poly(ether sulfone), a polyimide, a cellulose ester such as cellulose acetate, a poly(vinyl alcohol-co-acetal) or a poly(ethylene terephthalate). The support for the dye-receiving element may also be reflective such as baryta-coated paper, polyethylene-coated paper, white polyester (polyester with white pigment incorporated therein), an ivory paper, a condenser paper or a synthetic paper such as DuPont Tyvek®.

A dye image-receiving layer such as that found in Kodak Ektatherm receiver catalog #172-5514.

The dye image-receiving layer may comprise, for example, a polycarbonate, a polyurethane, a polyester, poly(vinyl chloride), poly(styrene-co-acrylonitrile), polycaprolactone or mixtures thereof. The dye image-receiving layer may be present in any amount which is effective for the intended purpose. In general, good results have been obtained at a concentration of from about 1 to about 5 g/m$^2$.

B. Donor Element:

Protective layer donor elements were prepared by coating on 6 µm PET (poly(ethylene terephthalate)) support:

On the back side of the element were coated the following layers in sequence:

1) a subbing layer of 0.13 g/m$^2$ titanium butoxide (DuPont Tyzor TBT®) from an 85% n-propyl acetate and 15% n-butyl alcohol solvent mixture.

2) a slipping layer containing an aminopropyl-dimethyl-terminated polydimethylsiloxane, PS513 (United Chemical Technologies, Bristol, Pa.) (0.011 g/m$^2$), a poly(vinylacetal)(Sekisui KS-1) binder (0.38 g/m$^2$), p-toluenesulfonic acid (0.0003 g/m$^2$), candellila wax (0.022 g/m$^2$) coated from a solvent mixture of diethylketone, methanol and distilled water (88.7/9.0/2.3)

C. Protective Overlayer:

On the front side of the element was coated a transferable overlayer of poly(vinyl acetal), KS-1, (Sekisui Co.), at a laydown of 0.63 g/m$^2$, colloidal silica, IPA-ST (Nissan Chemical Co.), at a laydown of 0.462 g/m$^2$, and divinylbenzene beads, 4 micron average diameter, (Eastman Kodak Company), at a laydown of 0.011 g/m$^2$, coated from a 79% 3-pentanone and 21% methanol mixture.

D. Test Conditions

Using Kodak Professional EKTATHERM XLS XTRALIFE Color Ribbon (Eastman Kodak Co. Catalog No. 807-6135) and a Kodak Model 8300 Thermal Printer a Status A neutral density image with a maximum density of at least 2.3 was printed on the receiver described above. The color ribbon-receiver assemblage was positioned on an 18 mm platen roller and a TDK thermal head (No. 3K0345) with a head load of 6.35 Kg was pressed against the platen roller. The TDK 3K0345 thermal print head has 2560 independently addressable heaters with a resolution of 300 dots/inch and an average resistance of 3314Ω. The imaging electronics were activated when an initial print head temperature of 36.4° C. had been reached. The assemblage was drawn between the printing head and platen roller at 16.9 mm/sec. Coincidentally, the resistive elements in the thermal print head were pulsed on for 58 µsec every 76 µsec. Printing maximum density required 64 pulses "on" time per printed line of 5.0 msec. The voltage supplied was 13.6 volts resulting in an instantaneous peak power of approximately 58.18×10−3 Watt/dot and the maximum total energy required to print Dmax was 0.216 mJoules/dot. The process is repeated sequentially, yellow, magenta, cyan to obtain the desired neutral image.

Application of the transferable protective overlayer to the receiver layer was done using a head voltage of 13.6 volts with an enable width of 72 microseconds. The size of the print is 2400×2680 pixels.

Referring now to FIGS. 1-4, there will be described a method of making a print in accordance with the present invention. In the preferred method shown in FIG. 1, thermal print head 10 comprising resistive elements 12 are used to transfer a protective overlayer 14 from a donor element 16 to a print 18. Print 18 comprises an image layer 26 on a support media 28. Print 18 of this invention is not limited to a thermally transferred dye print, and can include any other method of creating a print, for example, inkjet, electrophotograhic, lithography, etc. The donor element 16 comprises a slipping layer (not shown) and a subbing layer (not shown) coated on a backside of a donor support 22. On the front side of the donor support is coated a donor overlayer 24.

As shown in FIG. 1, with the image layer 26 of print 18 in contact with the donor overlayer 24 of donor element 16, the donor overlayer 24 can be transferred to print 18 by thermal print head 10. As thermal print head 10 moves in direction "A" and resistive elements 12 are selectively energized to different degrees, the donor overlayer 24 is caused to separate from the donor support 22 and attach to the image layer 26 of print 18 in different thickness. The energy required to transfer the donor overlayer 24 in section "1*a*" is greater than the energy required to transfer the donor overlayer 24 in section "1*b*" resulting in the thickness of the protective overlayer 14 in section "1*a*" to be greater than the thickness of the protective overlayer 14 in section "1*b*". In this embodiment, protective overlayer 14 is a continuous layer over the entire surface area of image layer 26, and the thickness of protective overlayer 14 at any given point is limited to the thickness defined in either section "1A" or "1B".

Figure 2:
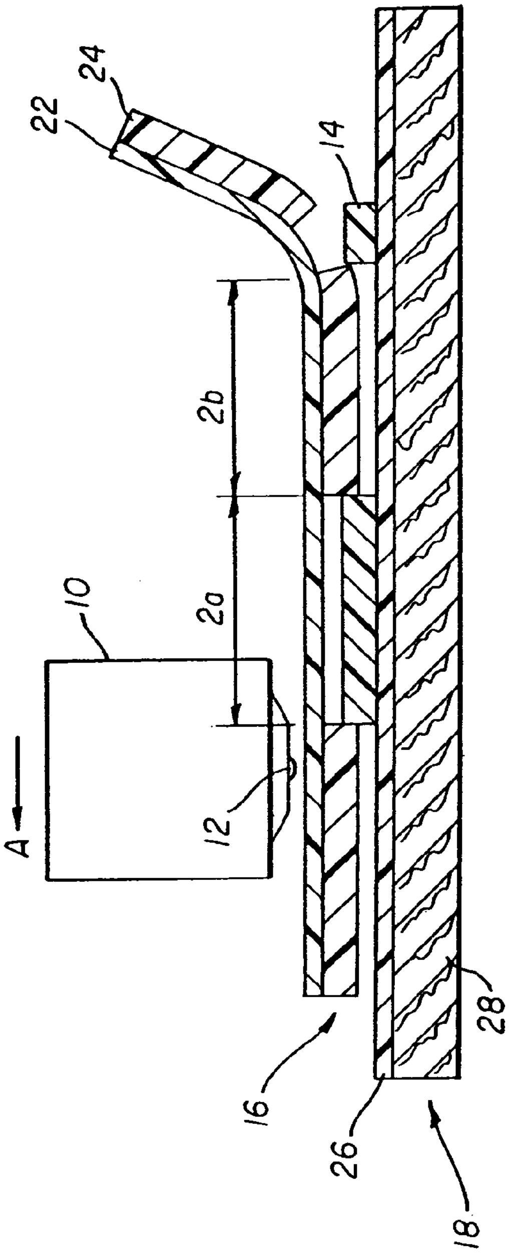

Shown in FIG. 2 is an alternate embodiment of the current invention. With the image layer 26 of print 18 in contact with the donor overlayer 24 of donor element 16, the donor overlayer 24 can be transferred to the print 18 by thermal print head 10. As thermal print head 10 moves in direction "A" and resistive elements 12 are selectively energized, the donor overlayer 24 is caused to separate from the donor support 22 and attach to the image layer 26 of print 18 in the selective areas. The thermal print head 10 is energized as it moves across section "2*a*", and de-energized as it moves across section "2*b*". In this embodiment, protective overlayer 14 is not a continuous layer over the entire surface area of image layer 26, and the thickness of protective overlayer 14 at any given point is limited to the thickness defined in either section "2*a*" or "2*b*".

Figure 3:
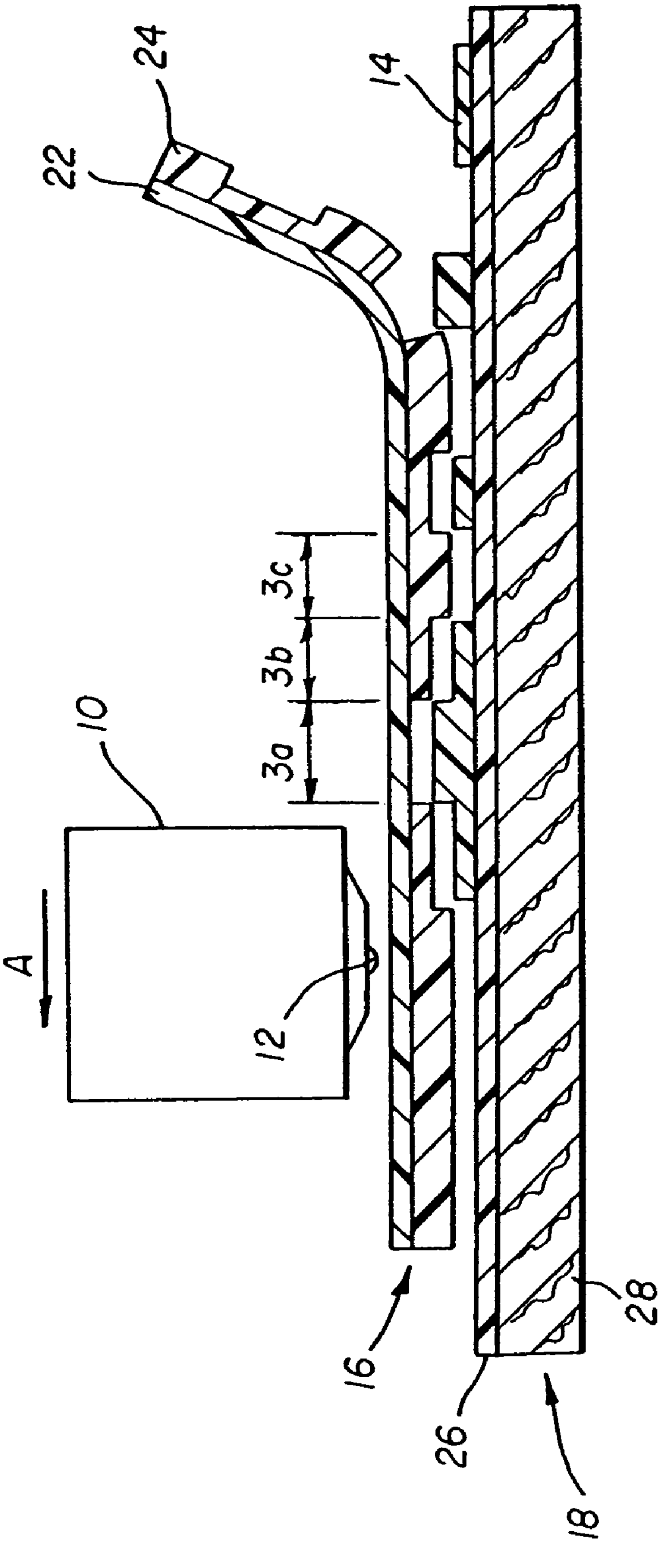

Shown in FIG. 3 is another alternate embodiment of the current invention. With the image layer 26 of print 18 in contact with the donor overlayer 24 of donor element 16, the donor overlayer 24 can be transferred to the print 18 by thermal print head 10. As thermal print head 10 moves in direction "A" and resistive elements 12 are de-energized or selectively energized to different degrees, the donor overlayer 24 is caused to separate from the donor support 22 and attach to the image layer 26 of print 18 in different thickness. The energy required to transfer the donor overlayer 24 in section "3*a*" is greater than the energy required to transfer the donor overlayer 24 in section "3*b*". In section "3*c*", the thermal print head 10 is de-energized. The resulting in the thickness of the protective overlayer 14 in section "3*a*" is greater than the thickness of the protective overlayer 14 in section "3*b*", and there is an absence of protective overlayer in section "3*c*". In this embodiment, the thickness of protective overlayer 14 at any given point is limited to the thickness defined in either section "3*a*", "3*b*", or "3*c*".

Figure 4:
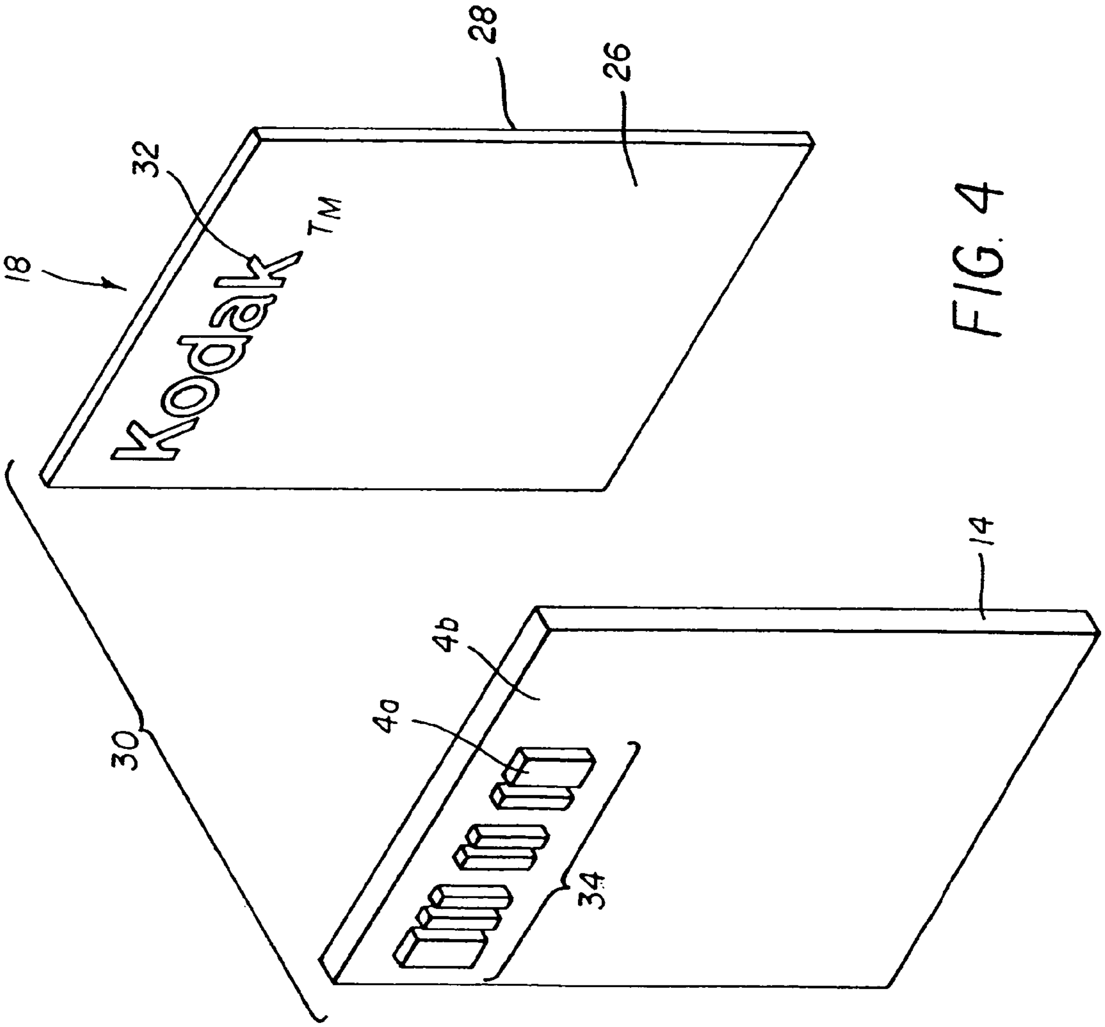
FIG. 4 is an exploded view of a label showing the image layer separate from the protective overlayer.

Referring now to FIG. 4, there is shown a product made in accordance with the preferred method of the current invention. For the purpose of discussion, the product shown is a label 30. On the image layer 26 of label 30 is an image 32, and the protective overlayer 14 of label 30 comprises information-bearing indicia 34. The information-bearing indicia 34 shown is in the form of a bar code. The energy required to transfer the protective overlayer 14 in section "4*a*" is greater than the energy required to transfer the protective overlayer 14 in section "4*b*" resulting in the thickness of the protective overlayer 14 in section "4*a*" to be greater than the thickness of the protective overlayer 14 in section "4*b*". The resulting thickness differential defines indicia. It should be noted that the information-bearing indicia is not limited to a bar code, but can take any form, for example Braille, text, symbols, etc. As shown in FIG. 4, the location of the information bearing indicia 34 overlap the image 32 on print 18. Protective overlayer 14 is substantially transparent, and the incorporated information-bearing indicia 34 in protective overlayer 14 does not add any human detectable opacity. Therefore, image 32 is viewable through protective overlayer 14 and information-bearing indicia 34.

Figure 5:
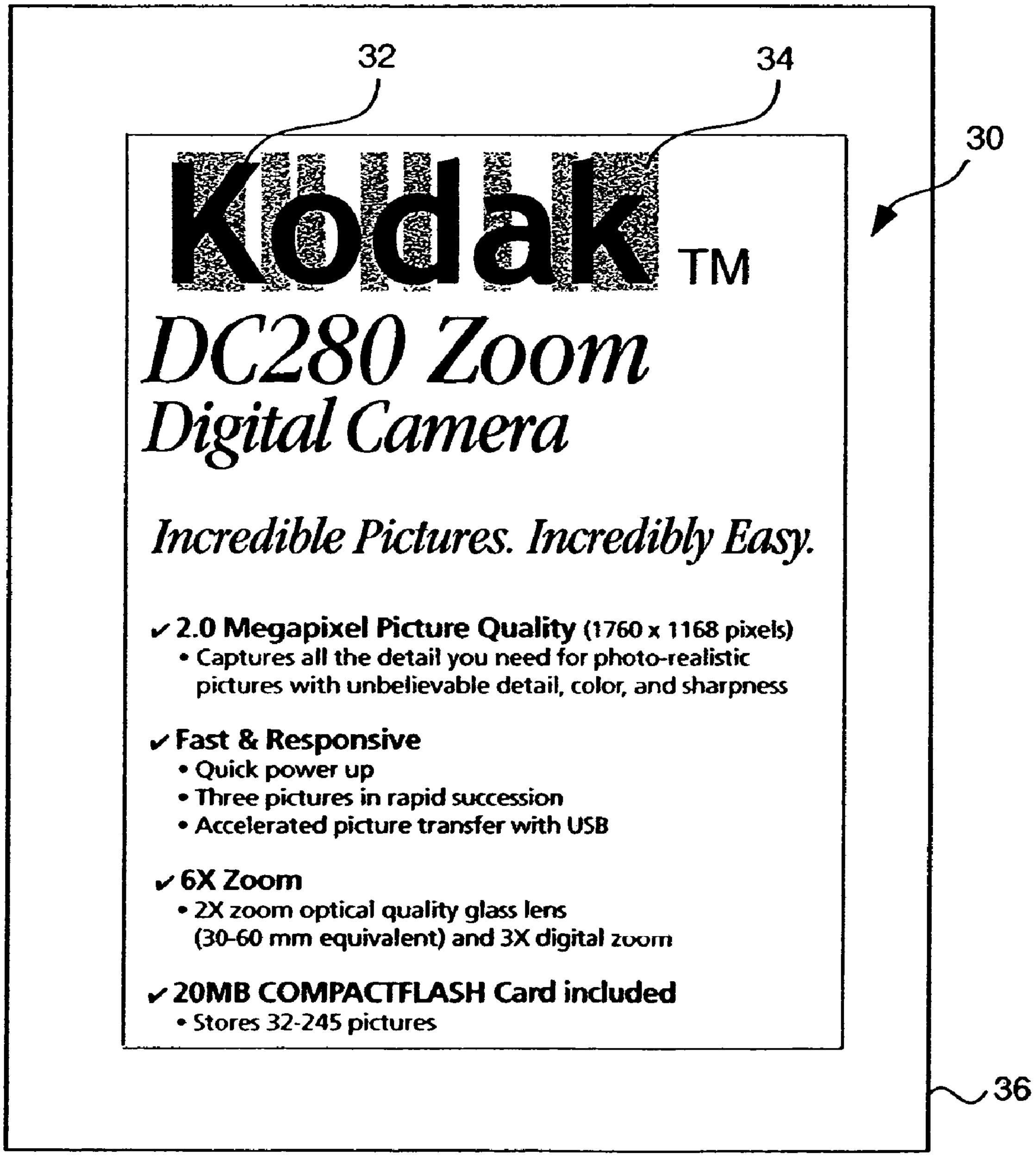
FIG. 5 is a plan view of a label having machine-readable indicia imbedded the protective overlayer, and located on a product.

Shown in FIG. 5 is a product 36 onto which label 30 is applied. Image 32 on label 30 is visible to the viewer and human readable. The information-bearing indicia 34 is machine-readable, therefore, substantially invisible to the viewer.

Next will be described several methods for reading the data embedded in the protective overlayer 14. The methods described are forms of surface profilometry. It should be noted that we are not limited to the methods described herein, and that other methods reading the data by surface profilometry may be applied.

Figure 6A:
FIG. 6A is a graph showing the results of a topographic test done (Gould Microtopographer stylus instrument)
Figure 6B:
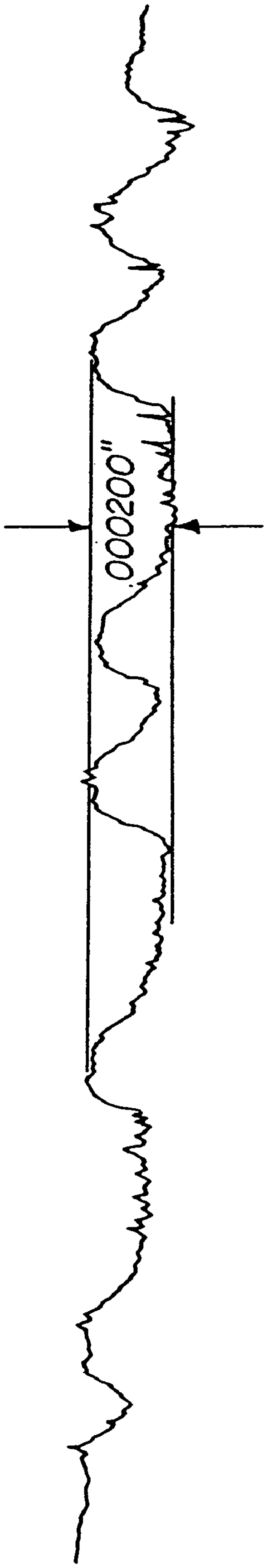
FIG. 6B is a single trace of the graph of FIG. 6A.

FIG. 6A shows a topographic representation of information-bearing indicia 34 taken along a multiple traces using a Gould Microtopographer stylus instrument. This technique for measuring/mapping the physical surface contour is done with a contact instrument using a diamond stylus with a light load (50 mg). The diamond stylus tip has a 2.5-micron radius with a 90 degree included angle. Multiple traces are required to map the surface of an area. A single trace as shown in FIG. 6B is limited to surface contact area of the stylus tip. In this example, it should be noted that measurements could be read directly from the graph to determine the physical size relationship of the surface characteristics. The stylus indexes after each trace, and the system is calibrated to specimen #2071 traceable to the National Institute of Standards and Technology (NIST). In this example, the information shown in the topographic representation can be translated into bar code information by converting the peaks to bars and the valleys to spaces.

Figure 7A:
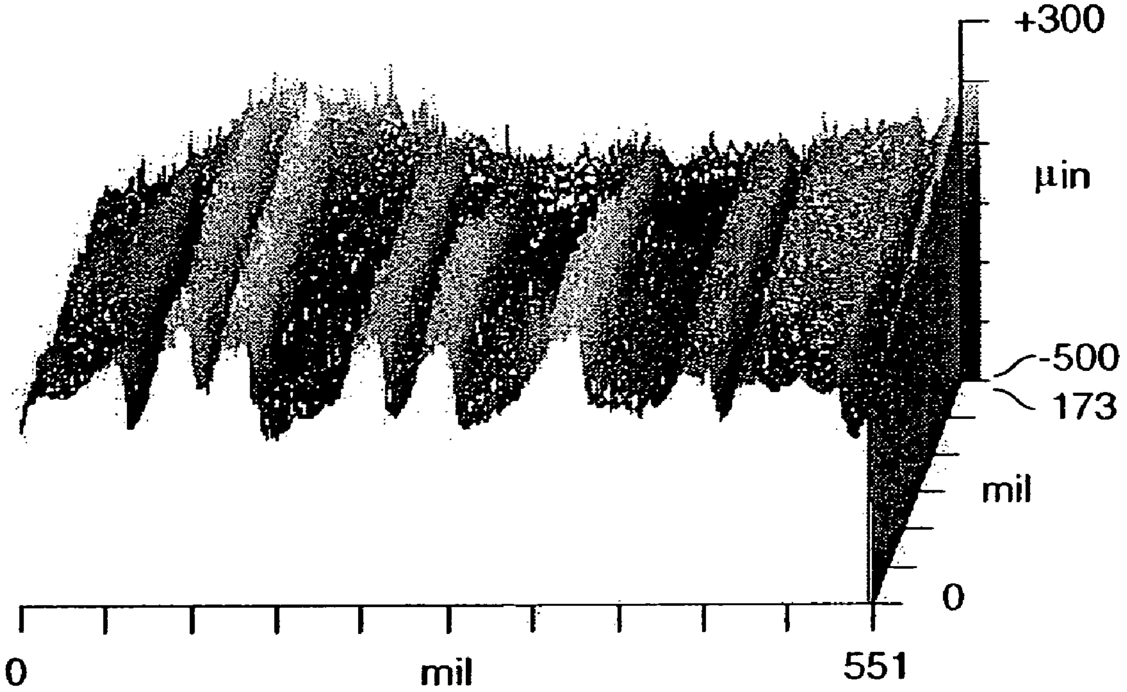
FIG. 7A is a graph showing the results of a topographic test done (Zygo)
Figure 7B:
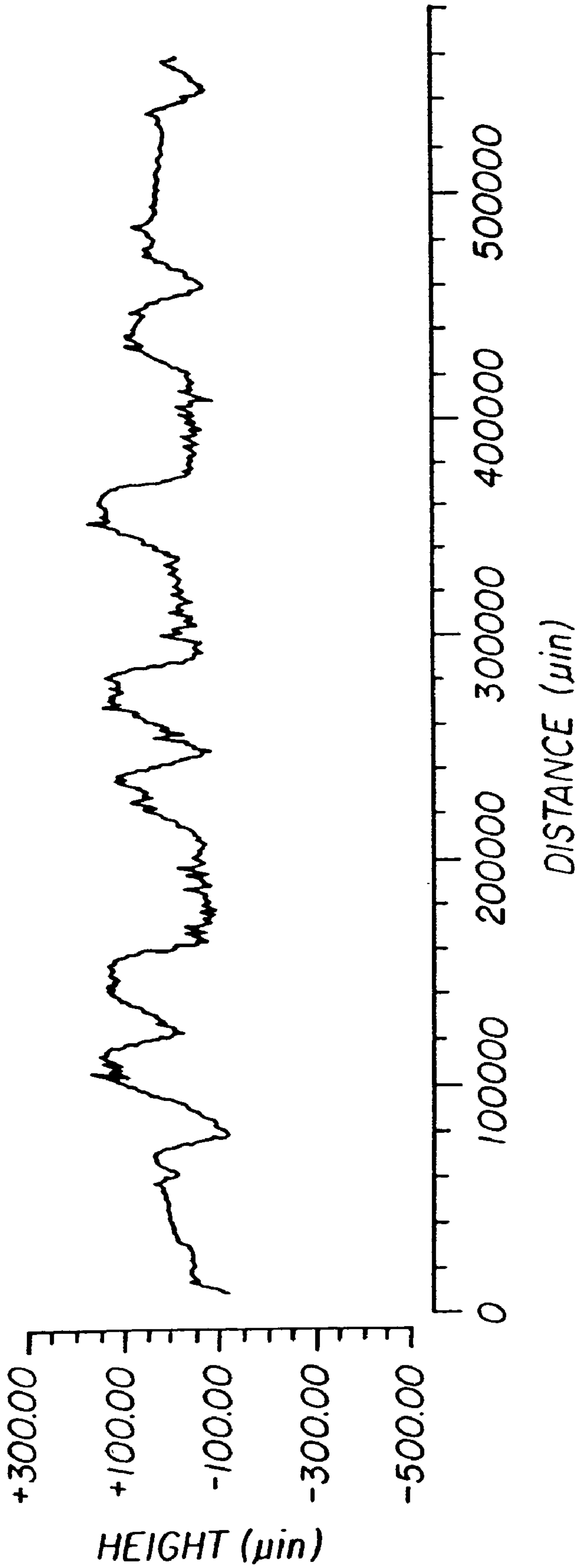
FIG. 7B is an elevation view of the graph of FIG. 7A.

FIGS. 7A and 7B show a topographic representation of information-bearing indicia 34 mapped using a Zygo NewView 5000. This technique for measuring/mapping the surface is done using a non-contact 3D optical profiler, having sub-nanometer z resolution, and is capable of mapping areas up to 17.5 mm. FIG. 7A is an oblique view of the total mapped area, while FIG. 7B is an elevation view showing the surface profile.

Figure 8A:
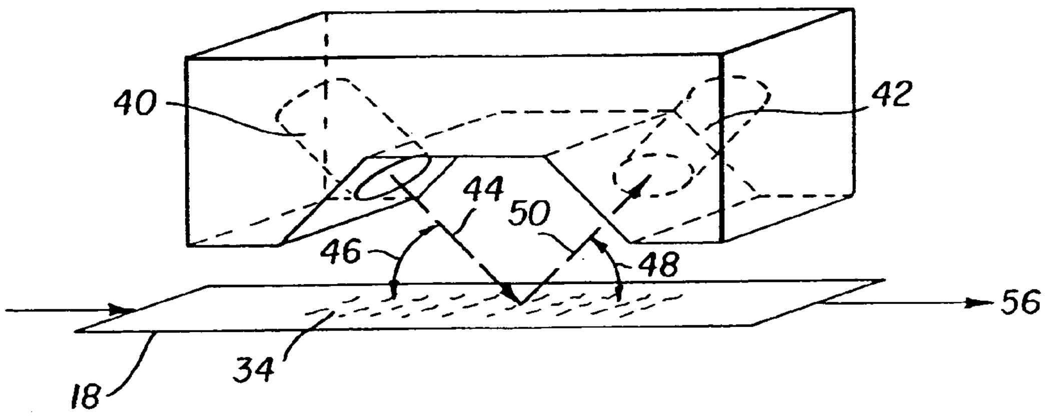
FIG. 8A represents a method of reading the encoded overcoat by means of direct illumination.

FIG. 8A represents a means for reading the information contained in the code within the overcoat using direct illumination 40 and an optical detector 42. The preferred illumination source for this application is a collimated visible laser beam in the 600-700 nm wavelength range, as is commonly found within both handheld and point-of-sale bar code readers, or alternatively, a focussed spot of light from a non-coherent light source such as an incandescent or arc lamp. This type of reader detects the change in surface characteristics. In this method, an illuminating beam 44 is placed at a preferred incident angle 46 while the optical detector 42 is held at a suitable detection angle 48 such as to maximize the response of the detector to the modulation of a reflected light 50 beam as the target area is scanned. The preferred incident and detection angles will depend upon the actual materials used and degree of scattering from the encoded areas. Scanning is accomplished either by relative motion of the reader and code symbol or by opto-mechanical deflection of the incident beam typically using a oscillating or rotating mirror as is common practice in bar code readers.

Figure 8B:
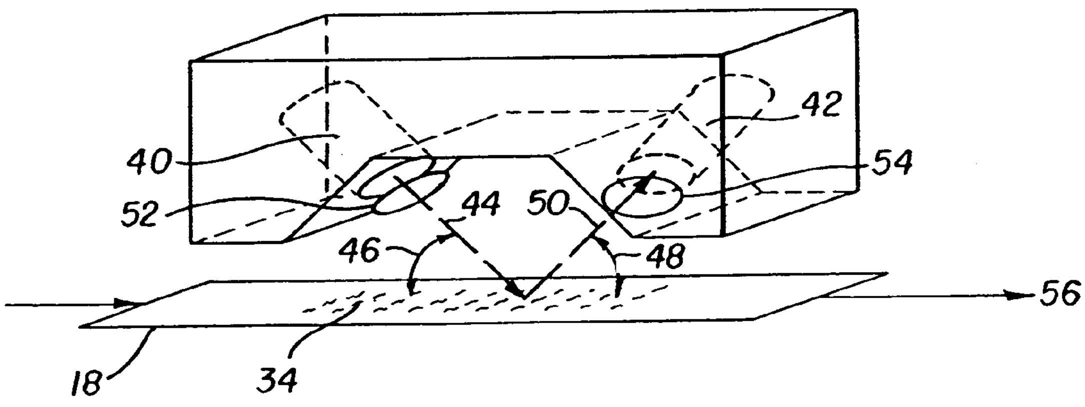
FIG. 8B represents a method of reading the overcoat by means of direct illumination in conjunction with a polarization analyzer.

FIG. 8B represents a means for reading the information contained in the code within the overcoat using direct illumination 40 and optical detection 42 with addition of a prepolarizer 52 and, subsequently, a polarization analyzer 54. The preferred illumination source for this application is a collimated visible laser beam in the 600-700 nm wavelength range, as is commonly found within both handheld and point-of-sale bar code readers. Alternatively, a focussed spot of light from an non-coherent light source, such as, an incandescent or arc lamp, the output of which has been polarized by a polarizing element may be used (not shown).

In this method, the polarized illuminating beam 44 is placed at a preferred incident angle 46 while the detector 42 is held at a suitable detection angle 48 such as to maximize the response of the detector to the modulation of the reflected light beam as the target area is scanned. The polarization analyzer 54 is used as an analyzer to enable the discrimination between light whose polarization has been altered by the encodement from light whose polarization has not been effected. The preferred incident, detection, and polarization angles will depend upon the actual materials used and degree of de-polarization of the incident light in the encoded areas. Scanning is accomplished either by relative motion of the reader and code symbol or by opto-mechanical deflection of the incident beam typically using a galvanometer or rotating mirror as is common practice in bar code readers.

Common to both FIGS. 8A and 8B, as print 18 moves in the direction of arrow 56, illuminating beam 44 illuminates information-bearing indicia 34 along a single trace in a linear fashion. In order to illuminate a larger area of the information-bearing indicia 34, multiple traces need to be taken in a step-wise function.

In the embodiment where the indicia 34 is a machine-readable code XX printed in a bar code format. One example of the bar code XX is the Universal Product Code (UPC). Other examples of standard 1D or linear bar codes are “2 of 5” and “3 of 9”. The previously mentioned bar codes are understood by those skilled in the art. These bar codes are read by scanning in a direction that is perpendicular to the bars and spaces via a bar code reader, such as, those commonly used in grocery store checkouts. However, it is to be understood that any suitable machine-readable code may be used that is currently available or may become available, for example, but not by way of limitation, a bar code.

In another embodiment where the indicia 34 is a readable pattern such as Braille. The incident-beam laser scans the topographic representation of information-bearing indicia, and via reflected or absorbed light records the topographic map in memory. The topographic map is then compared by running through a pattern recognition algorithm and matched known patterns for Braille letters. The pattern, for example, but not by way of limitation, Braille.

In yet another embodiment where the indicia 34 represents a binomial code, the incident-beam laser scans the code and it is decoded via a binomial code look up table.

Figure 9:
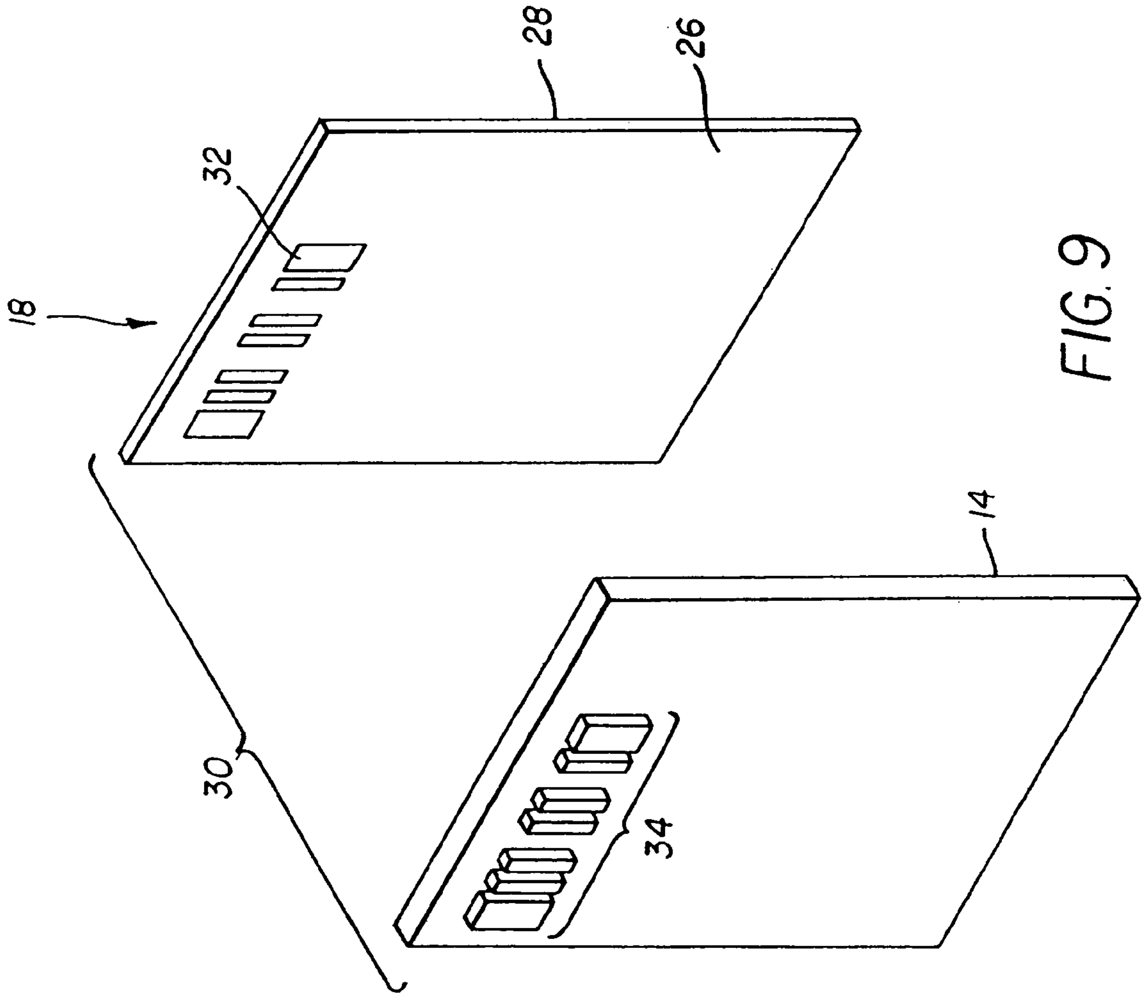
FIG. 9 is an exploded view of a label showing the image layer and protective layer having the identical image.

Referring now to FIG. 9, there is shown an alternate product made in accordance with the preferred method of the current invention. For the purpose of discussion, the product shown is a label 30. FIG. 9 is an exploded view of a print having identical indicia printed on the image layer 26 and in a protective overlayer 14. As shown in FIG. 9, the represented indicia is a 1-Dimensional (1-D) bar code. It should be noted that the indicia is not limited to a bar code, but can take any form, for example, Braille, text, symbols, 2-Dimensional code, etc. Image 32 and protective overlayer 14 of label 30 comprise information-bearing indicia 34. As shown in FIG. 9, the information bearing indicia 34 and image 32 comprise the same information, and the location of the information bearing indicia 34 exactly overlap the image 32 on print 18.

The reflective characteristics of the protective overlayer 14 are altered in the area of the information-bearing indicia 34. In addition, the reflective characteristics of the protective overlayer 14 are altered in the area that is in register with image 32. By default, the reflective characteristics of image 32 are such that light is absorbed in printed areas and reflected in non-printed area. By changing the reflective characteristics of the protective overlayer 14 in register with the reflective characteristics of image 32, the readability of the indicia on label 30 is enhanced when read with an incident-beam laser scanner.

Figure 10:
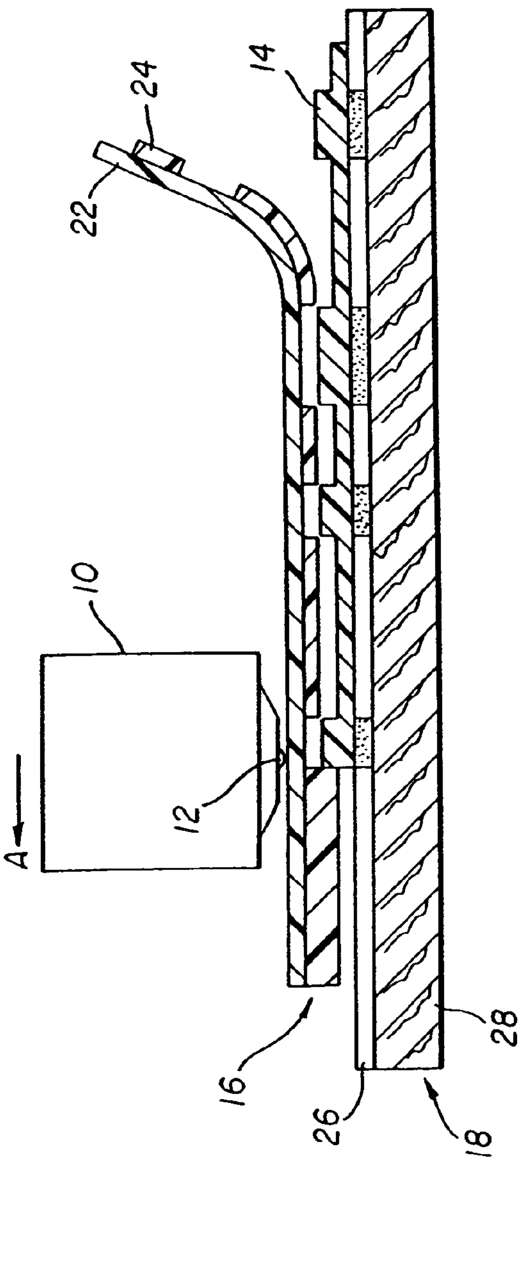
FIG. 10-13 shows various embodiments of a print in the process of having the protective overlayer applied.
Figure 11:
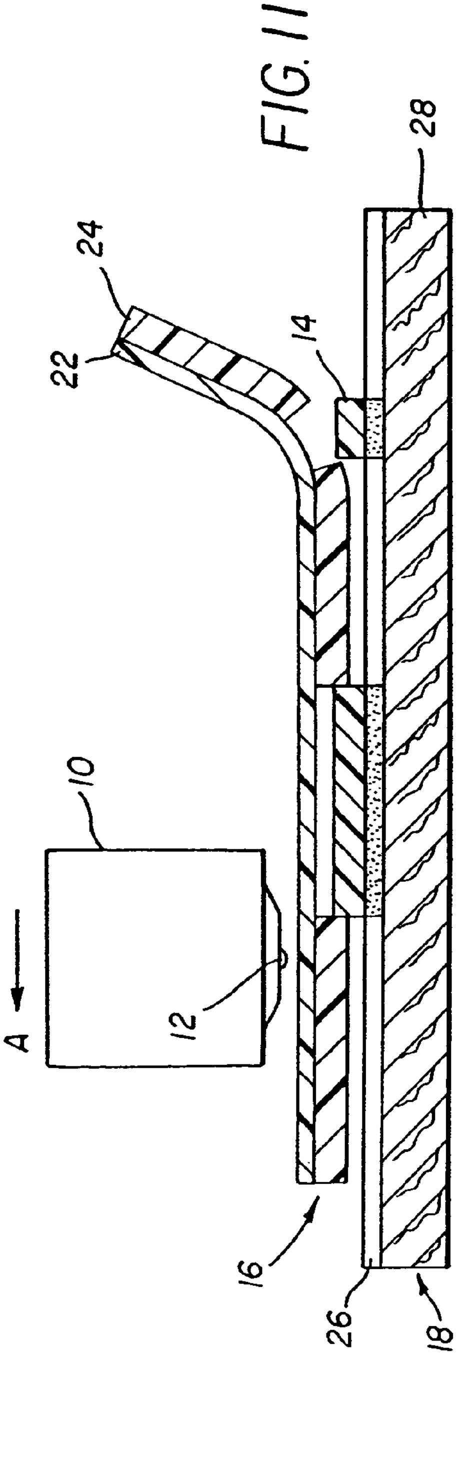
Figure 12:
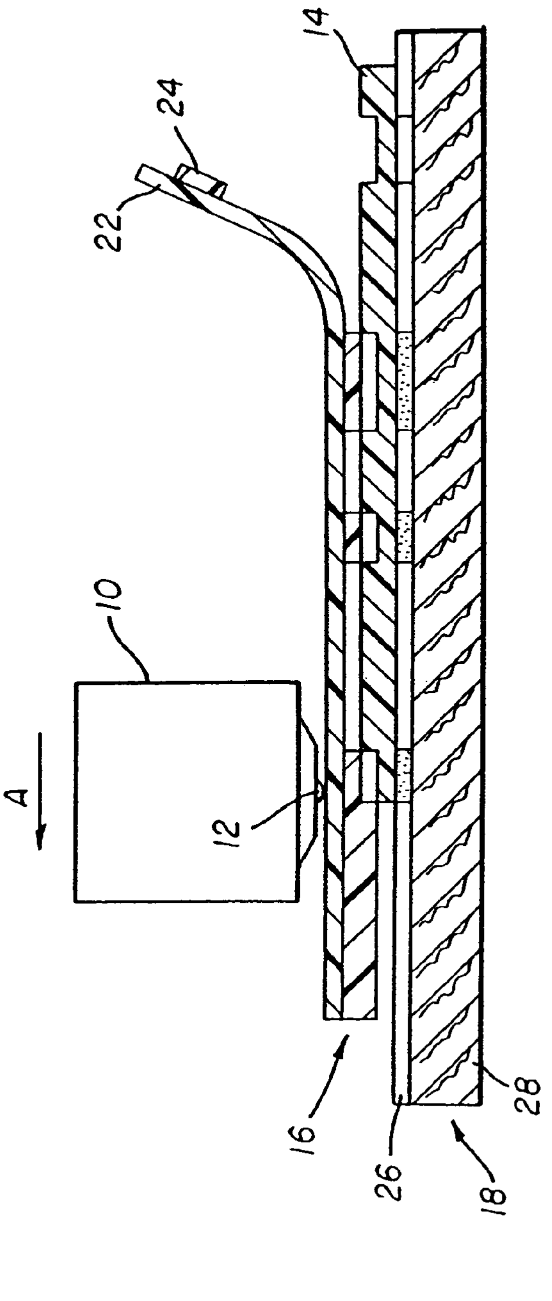
Figure 13:
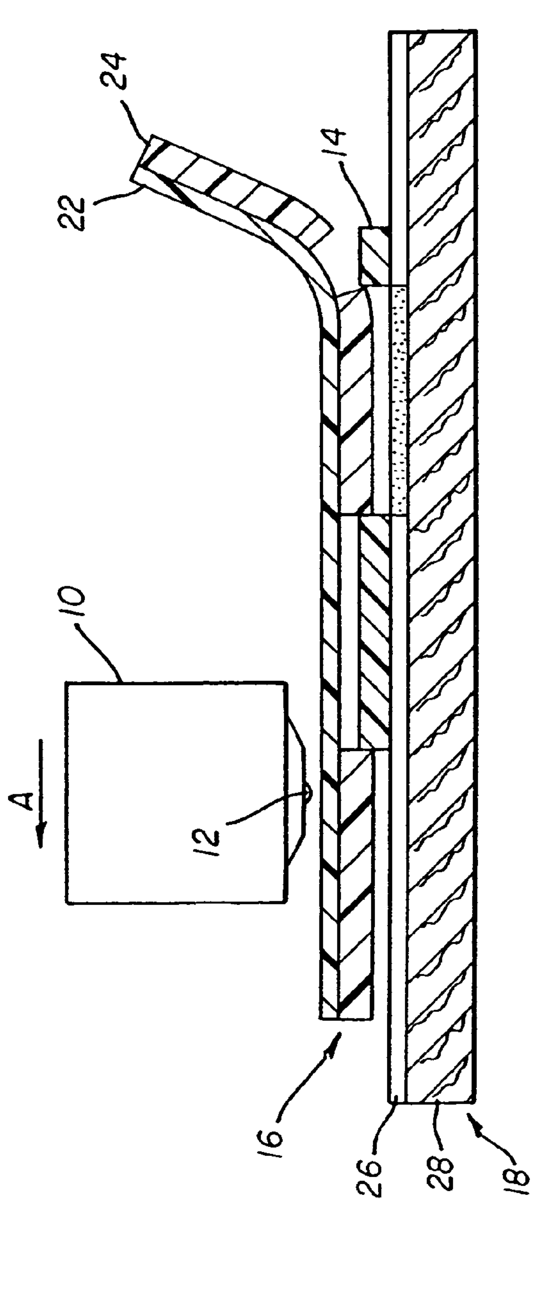

FIGS. 10-13 show various arrangements of indicia encoded into the protective overlayer 14. Specifically, FIG. 10 shows a minimum thickness of the protective overlayer applied over the entire surface of print 18, and a second greater thickness of the protective overlayer applied to the surface of print 18 where image 32 is located. The difference between the minimum and second greater thickness is such that a detectable difference can be discerned. FIG. 11 shows a maximum thickness of the protective overlayer applied to the surface of print 18 where image 32 is located, and an absence of the protective overlayer where there is an absence of an image. FIG. 12 shows a minimum thickness of the protective overlayer applied over the entire surface of print 18, and a maximum thickness of the protective overlayer applied to the surface of print 18 where there is an absence of an image. FIG. 13 shows a maximum thickness of the protective overlayer applied to the surface of print 18 where there is an absence of an image, and a maximum thickness of the protective overlayer applied to the surface of print 18 where image 32 is located.

A test was done to determine the readability of a bar code made in accordance with the present invention as shown in FIG. 9. Two sample bar codes were prepared. Sample “A” is a process black bar code printed using cyan, magenta, and yellow dyes on a white receiver. Sample “B” is a process black bar code printed using cyan, magenta, and yellow dyes on a white receiver plus image-wise application of the protective overlayer. Image-wise in this context meaning that the protective overlayer is applied only in the black areas of the bar code. Both samples were read using a 660-nm wavelength bar code reader. On a scale of 0-4.0, with 4.0 being the highest rating, sample “A” scored a rating of 3.5, and sample “B” scored a rating of 3.8. A 10% rating increase was realized when the protective overlayer was applied in an image-wise fashion.

In addition, it was noted that there is a difference in the readability of thermally printed bar codes depending on the orientation of the bar code to the direction of print. The difference was more notable when a protective overlayer was applied. Two sample bar codes were prepared. Sample “AA” is a process black bar code printed using cyan, magenta, and yellow dyes on a white receiver, an image-wise application of the protective overlayer, and where the orientation of the bars is 90° to the direction of print. Sample “BB” is a process black bar code printed using cyan, magenta, and yellow dyes on a white receiver, an image-wise application of the protective overlayer, and where the orientation of the bars is 0° to the direction of print. Both samples were read using a 660-nm wavelength bar code reader. On a scale of 0-4.0, with 4.0 being the highest rating, sample “AA” scored a rating of 3.0 and sample “BB” scored a rating of 3.8. A 25% rating increase was realized when the orientation of the bar code was 0° to the direction of print.

The entire contents of the patents and other publications referred to in this specification are incorporated herein by reference.

It should be noted that the image-bearing print portion of this invention is not limited to a thermally transferred dye print and can include any other method of creating a print, for example, inkjet, electrophotograhic, lithography, etc.

The invention has been described in detail with particular reference to certain preferred embodiments thereof, but it will be understood that variations and modifications can be effected within the scope of the invention.

PARTS LIST

10 print head
12 resistive elements
14 protective overlayer
16 donor element
18 print
22 donor support
24 donor overlayer
26 image layer
28 support media
30 label
32 image
34 indicia
36 product
42 optical detection
44 illuminating beam
46 incident angle
48 detection angle
50 reflective light
52 pre-polarizer
54 polarization analyzer
56 arrow

What is claimed is:

1. A method of providing a machine-readable indicia on a media having a protective overlayer comprising the steps of:

a) providing a first machine-readable indicia in an image layer on said media; and b) providing a second machine-readable indicia in a protective overlayer that is identical in content to, and in register with said first machine-readable indicia in said image layer.

2. A method of providing indicia on a media having a protective overlayer comprising the steps of:

a) providing a first machine-readable indicia in an image layer on said media; and b) providing a second machine-readable indicia in a protective overlayer that is identical in content to, and in register with said first machine-readable indicia in said image layer.

* * * * *